(No Model.)
D. W. GRANGER.
GUARD FOR CATTLE.
No. 270,054. Patented Jan. 2, 1883.
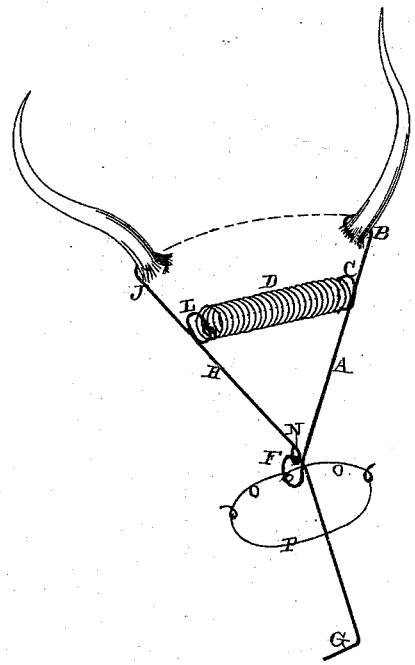
Witnesses.
Louis F. Gardner
E. D. York
Inventor.
D. W. Granger
per
F. A. Lehmann,
atty.

UNITED STATES PATENT OFFICE.

DENNIS W. GRANGER, OF FRANKLIN, NEW YORK.

GUARD FOR CATTLE.

SPECIFICATION forming part of Letters Patent No. 270,054, dated January 2, 1883.

Application filed November 4, 1882. (No model.)

*To all whom it may concern:*

Be it known that I, DENNIS W. GRANGER, of Franklin, in the county of Delaware and State of New York, have invented certain new and useful Improvements in Guards for Cattle; and I do hereby declare the following to be a full, clear, and exact description of the invention, such as will enable others skilled in the art to which it pertains to make and use it, reference being had to the accompanying drawing, which forms part of this specification.

My invention relates to an improvement in adjustable barbed-wire guards for cattle; and it consists in the combination of two light rods or wires, which are bent into suitable shape and attached to the animal's horns, and which are held in position by means of a coiled spring, the longer one of the two pieces having its lower end formed into a barb just over the animal's nose.

It further consists in a barbed wire and a suitable cord, which is passed around the animal's jaws, as will be more fully described hereinafter.

The object of my invention is to provide a wire guard for cows for the purpose of preventing them from sucking themselves or other cows.

The accompanying drawing represents my invention.

A represents the longer one of the two pieces of wire or light rods out of which the guard is formed. The upper end of this wire or rod has the eye or loop B formed upon it for the purpose of catching over one of the horns, and at a suitable distance below this point is formed another eye or loop, C, in which one end of the coiled spring D is made to catch. At a suitable distance from the eye C the wire or rod is coiled so as to form a spring, F, for the purpose of holding the barb C, which is formed upon the lower end of the rod or wire, out of contact with the animal's nose. This spring keeps the barb pressed outward until the cow presses her head against herself or some other animal or object, and the barb pricks her upon the front of the nose. As soon as the pressure is relieved from the barb it springs outward again. The second part of the barb consists of a shorter barb or rod, H, which has an eye, J, formed upon its upper end to catch over the other horn, an eye, L, for the other end of the coiled spring to catch in, and a third eye, N, to catch in the spring made in the other rod, and thus connect the two parts together. The coiled spring, which is interposed between the two parts, serves to hold the two parts of the barb together, and yet allow them to be adjusted to animals having different widths between their horns. In order to prevent this barb from becoming displaced upon the face of the animal, it is necessary that it should be secured in place so as to prevent any lateral play. For this purpose a lighter barbed wire, O, is hooked into the spring, and then fastened to the outer end of this barbed wire is a cord or spring, P, which is to be tied under the animal's jaw. These barbs project out upon each side of the animal's head and prevent the cow from either sucking herself or other cows.

I do not limit myself to the precise construction here shown, for that can be varied without departing from the spirit of my invention.

What I claim, and desire to secure by Letters Patent, is—

1. The combination of the rod A, having its lower end formed into a barb, with the rod H, and a spring for uniting the two parts, and suitable attachments for the horns, substantially as shown.

2. The combination of the rods A H, the barbed wire, cord P, and suitable horn attachments, substantially as set forth.

In testimony whereof I affix my signature in presence of two witnesses.

DENNIS W. GRANGER.

Witnesses:
L. L. HAMM,
W. Z. BRYANT.